Dec. 19, 1967  R. E. GARRETT  3,358,775
PLANT THINNING MACHINE AND METHOD
OF THINNING PLANTS
Original Filed April 22, 1965  4 Sheets-Sheet 2
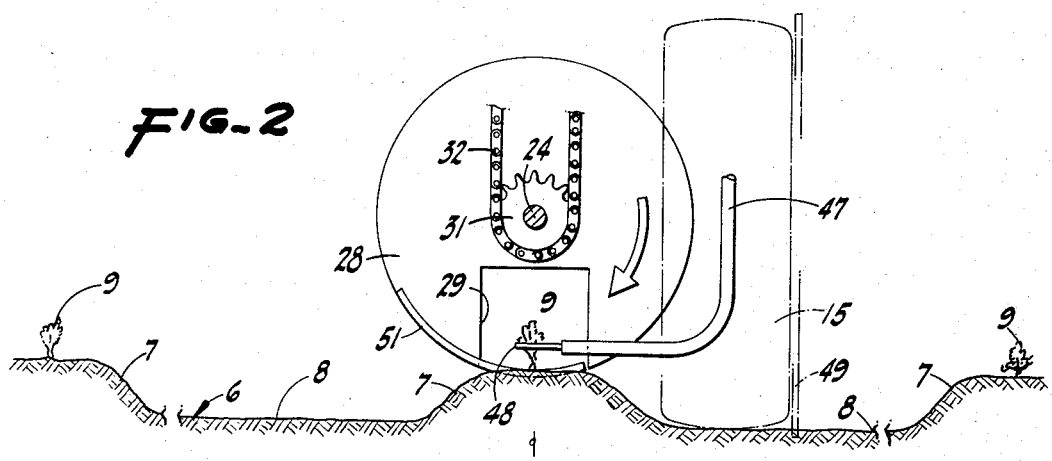
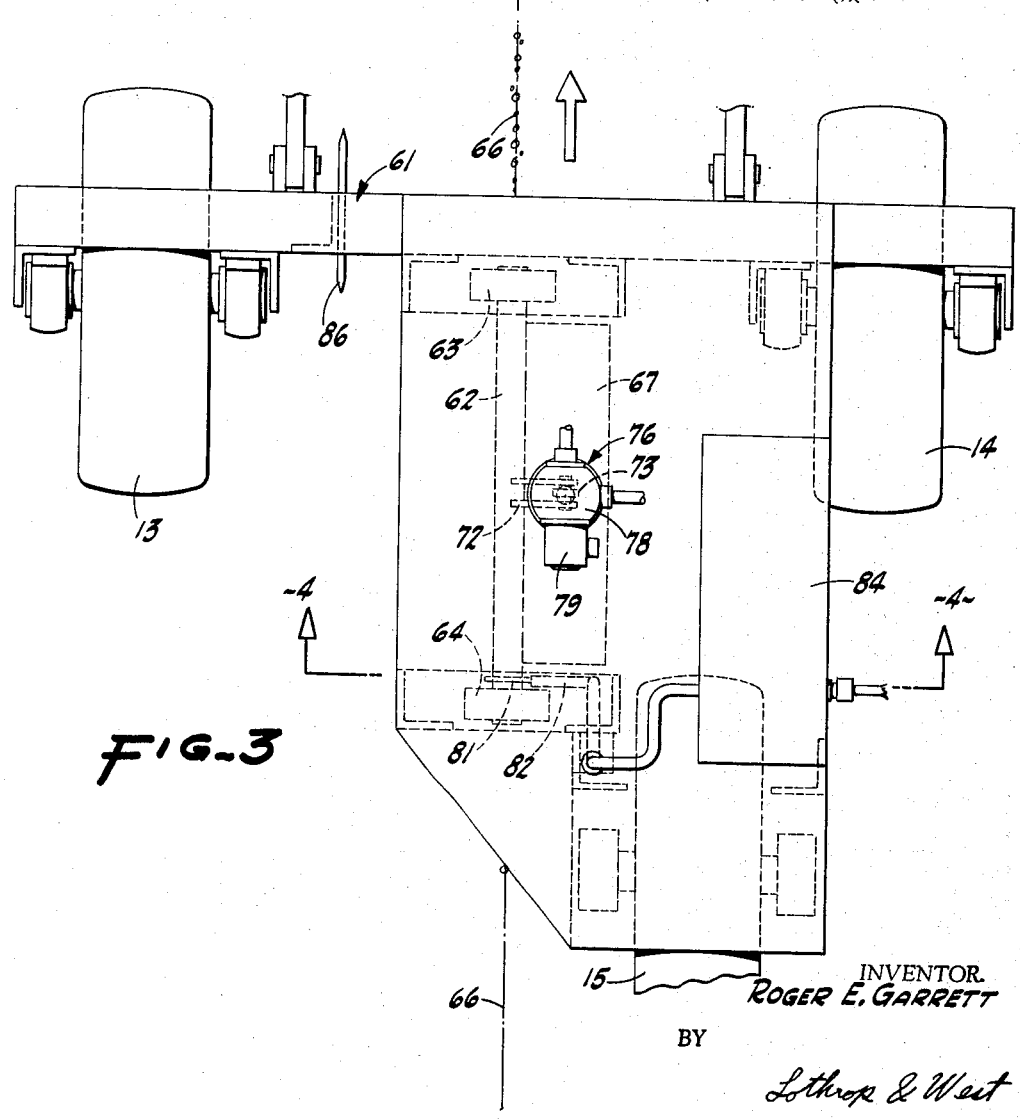
INVENTOR.
ROGER E. GARRETT
BY
Lothrop & West
ATTORNEYS Dec. 19, 1967
R. E. GARRETT
3,358,775
PLANT THINNING MACHINE AND METHOD OF THINNING PLANTS
Original Filed April 22, 1965
4 Sheets-Sheet 3
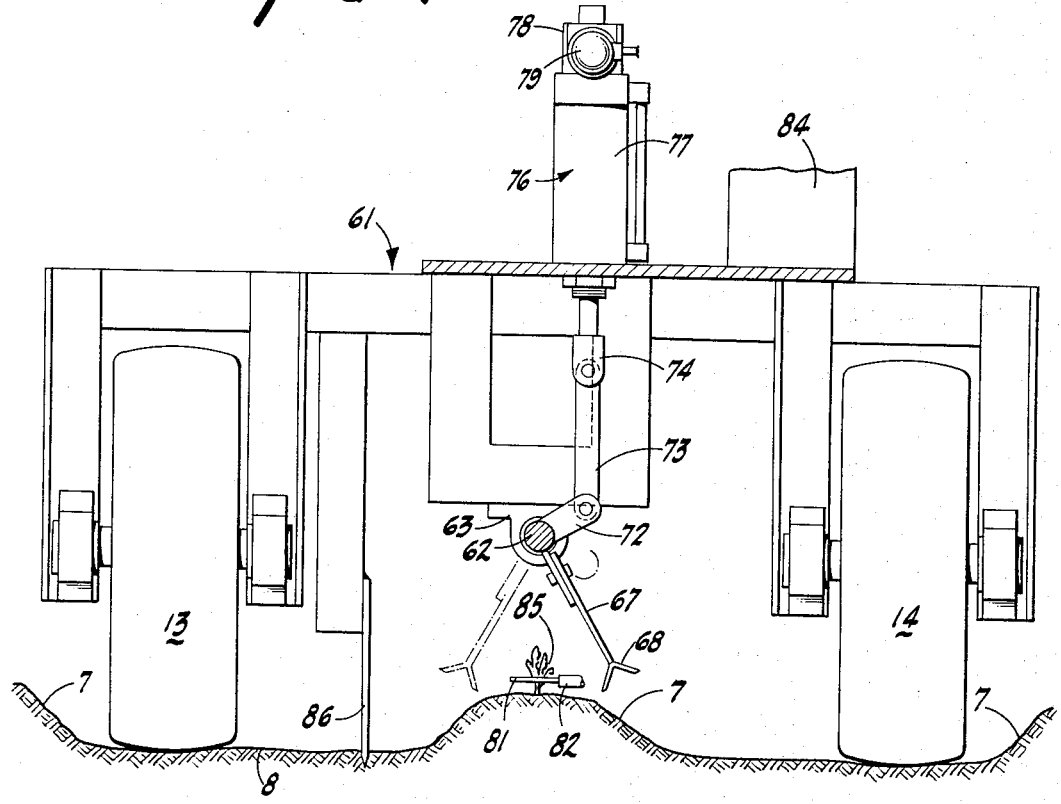
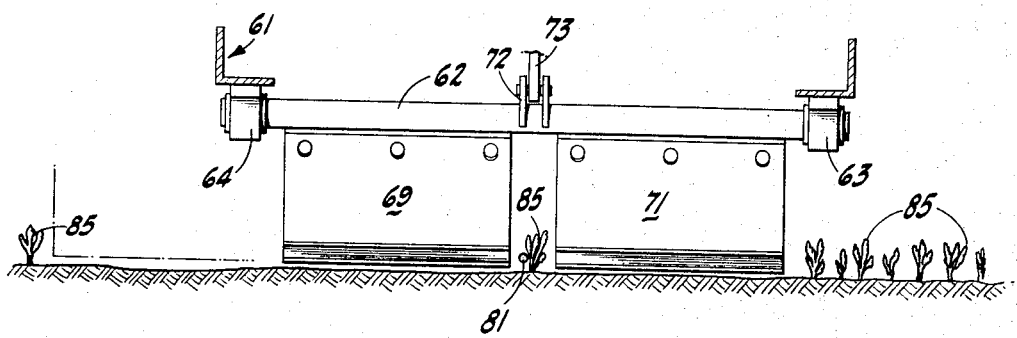
INVENTOR.
ROGER E. GARRETT
BY
Lothrop & West
ATTORNEYS

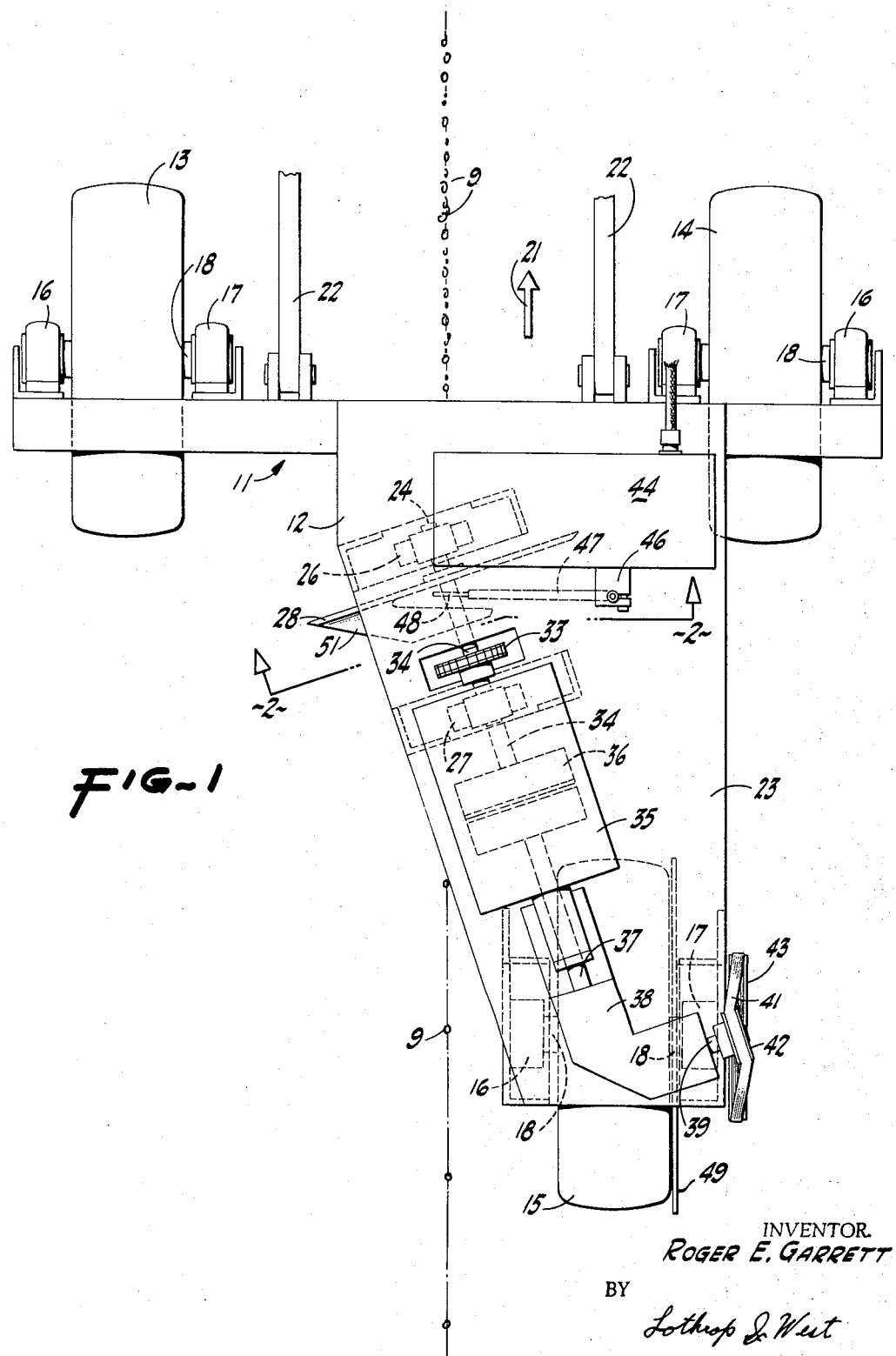

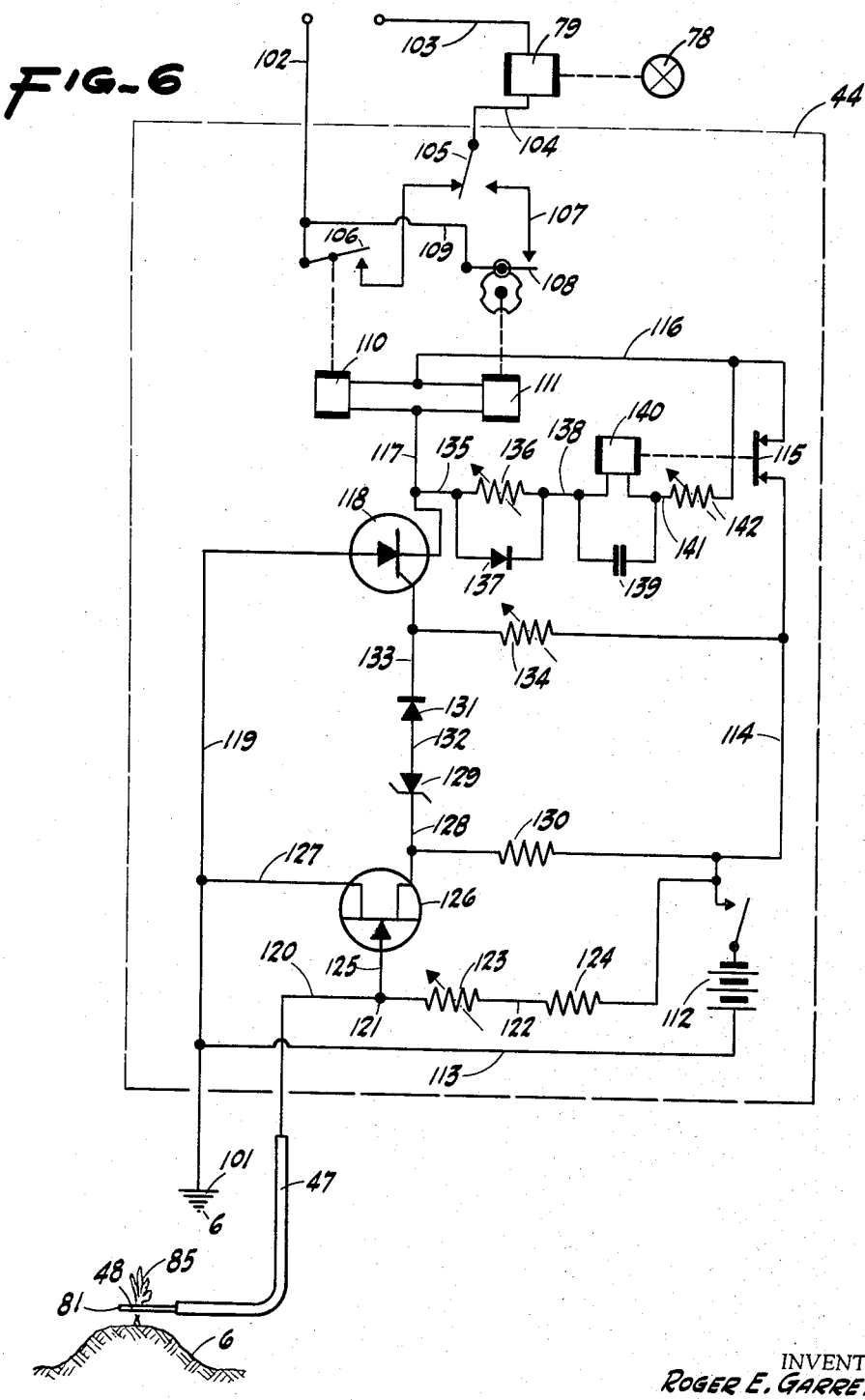

United States Patent Office 3,358,775
Patented Dec. 19, 1967

3,358,775
PLANT THINNING MACHINE AND METHOD OF THINNING PLANTS
Roger E. Garrett, Davis, Calif., assignor to The Regents of The University of California, Berkeley, Calif.
Continuation of application Ser. No. 449,963, Apr. 22, 1965. This application Nov. 22, 1966, Ser. No. 596,344
4 Claims. (Cl. 172—6)

This is a continuation of application Serial No. 449,963, filed Apr. 22, 1965, and now abandoned.

My invention relates primarily, although not exclusively, to agricultural machinery and is particularly concerned with a mechanism and method by means of which the plants growing in a field after planting are reduced in number and spacing to a close approximation of a desired pattern.

In the cultivation of many plants; for example, lettuce and the like, it is customary to level the land quite accurately, particularly for irrigation, and to leave the land cultivated in furrows evenly spaced apart on opposite sides of parallel ridges. Lettuce seed is planted in the ridges in rows or lines generally straight and spaced apart a predetermined distance from the adjacent rows and with the furrows in between. Because of uncertainities in the emergence of seed, it is customary to plant in the row from twelve to fifteen times as many seed as would be requisite for the desired plants in proper spaced relationship if the emergence were one hundred percent successful. When the young plants then appear in the rows from those seeds that have emerged, it is customary to thin them by eliminating the plants intervening between those specimens which are to be permitted to grow to maturity. The retained plants are usually spaced apart an arbitrary distance; for example, one foot apart along the row or line.

Thinning has heretofore been practiced by manual means. This require a great deal of labor and particularly labor of a sort now difficult to get. There is, consequently, a demand for an improved mechanism and method for arriving at properly spaced, maturing plants and for eliminating intervening plants.

Machines for this purpose have heretofore been proposed. Many of them work by a technique of arbitrarily eliminating blocks of plants between geometrically predetermined sites. The difficulty is that sometimes a specimen does not actually occur at the expected geometrical site and an adjacent plant is removed which otherwise could be permitted to grow to maturity as a substitute. There has, consequently, been developed mechanism for sensing the occurrence of a plant in the row at any location and for then eliminating the adjacent plants. A difficulty has arisen, however, in that the sensing mechanisms employed if sufficiently sensitive are likewise upset by the general vibration and motion of the machine, so that signals are generated when none should properly be given, and great practical difficulties have arisen.

Other devices of this sort rely upon the use of electric eyes and comparable optical sensing devices. These are reasonably effective when they are clean, but normal operating conditions in the field, particularly dust, tend quickly to interrupt the satisfactory operation of the optical system. There is usually considerable unreliability connected with optical selecting means.

It is therefore an object of the invention to provide a plant thinning machine and method which are effective to sense the presence of a plant in a row and for removing adjacent blocks of plants, and which are not disturbed by random motion and vibration and are not adversely affected by dust or comparable deleterious ambient conditions.

Another object of the invention is to provide a plant thinning machine which can be utilized in connection with rows of plants as ordinarily planted and which is effective to remove a block of plants only when such block is adjacent a plant specimen that is to be preserved.

Another object of the invention is to provide a plant thinning machine which acts quickly and accurately to detect an appropriate specimen plant and to remove the adjacent undesirable plants.

Another object of the invention is to provide a plant thinning machine which depends for its operation upon the characteristics of a specimen plant itself.

Another object of the invention is to provide a plant thinning method which utilizes the plant itself as part of the selection step.

Another object of the invention is to provide an improved plant thinning machine.

Other objects together with the foregoing are attained in the embodiment of the invention and in the practice of the method thereof described in the accompanying description, the device being illustrated in the accompanying drawings, in which:

FIGURE 1 is a plan of one form of plant thinning machine constructed pursuant to the invention, the machine being shown in action in the field;

FIGURE 2 is a cross section, the planes of which are indicated by the lines 2—2 of FIGURE 1;

FIGURE 3 is a plan of a modified form of device pursuant to the invention;

FIGURE 4 is a cross section through a portion of the device of FIGURE 3, the plane of section being indicated by the line 4—4 of FIGURE 3;

FIGURE 5 is a fragmentary view showing in side elevation one form of plant removing structure; and FIGURE 6 is a schematic diagram showing the electrical circuitry employed in connection with the structure.

While the plant thinning machine pursuant to the invention can be embodied in a number of different forms, it has successfully been operated in both of the forms shown herein. As shown in FIGURES 1 and 2, the structure is for use on the ground 6, which has previously been prepared to provide ridges 7 and intervening furrows 8. In each ridge there is provided a row 9 of plants. Usually two parallel lines or rows are planted, but for simplicity herein, but one line or row is shown located on the longitudinal center line of the ridge. The plants are of any sort, but for convenience are illustrated as lettuce. Eventually the plants must be spaced more or less evenly a large distance apart. Initially, enough seeds are planted so that the young plants are very close together, although some seeds may not grow at all, resulting in random gaps.

Designated to operate on the ground 6 is a carriage 11 including a metal frame 12 made up of a number of structural shapes supported on a pair of front wheels 13 and 14 and a rearward wheel 15. Usually the wheels 13, 14 and 15 are rubber tired. The frame is connected to the wheels by journals 16 and 17 carrying the wheel axles 18. The carriage 11 is advanced in the direction of the arrow 21 in FIGURE 1 by any suitable propulsion mechanism represented by draft beams 22. If desired, the carriage 11 can actually be constituted by a tool bar or comparable part of a tractor.

Adjacent its rearward portion, the frame 12 is provided with a supporting plate 23 overlying the rearmost wheel 15 and supporting an operating shaft 24 carried in bearings 26 and 27 and disposed in a horizontal plane. The shaft axis is at an angle to the line of the row 9 and to the direction of advance 21. The shaft 24 carries a rotary disc 28 of a diameter so that the rim of the disc comes close to or even slightly below the upper surface of the ridge 7. The disc for a portion of its periphery is interrupted to provide a window 29 of rectangular configuration extending in from the rim of the wheel and of sufficient area to pass easily the largest size specimen with which the device is to work. The disc 28 when not rotating is locked or held in a "full cycle" position so that the window 29 is in a central position, as shown in FIGURE 2, and passes the plants freely.

The orientation of the disc is controlled by connecting a sprocket 31 on the shaft 24 by means of a chain 32 to a sprocket 33 on a clutch shaft 34. The clutch shaft extends from a housing 35 encasing a single cycle clutch 36. This clutch is not illustrated in detail, but is a standard commercial item. It has the characteristic of remaining locked in a set position until it is momentarily energized. Upon energization, the clutch is effective to drive the shaft 34 through exactly one revolution and then to lock the shaft in its full cycle position until another energization is received.

The single cycle clutch is mechanically driven. Extending from the housing 35 is a clutch drive shaft 37 connected through appropriate bevel gears (not shown) located in a housing 38 on the plate 23 to a drive shaft 39. A belt 41 is in engagement with a pulley 42 on the drive shaft 39 and is also in engagement with a drive pulley 43 on the axle 18 of the rear wheel 15. As the frame advances and the wheel 15 is revolved, the motion is transmitted by the belt 41 and through the bevel gears and the shaft 37 to the single cycle clutch.

As the carriage advances along the row 9, the disc 28 remains fixed in its full cycle position until such time as an impulse is received to actuate the single cycle clutch. Thereupon the disc 28 revolves through one rotation as the machine advances. When the disc returns to its original location, it is again locked in full cycle position, pending the receipt of a further impulse.

Pursuant to the invention, particular means are provided for sending an appropriate actuating impulse to the single cycle clutch 36.

Connected to the frame 12 is a housing 44 containing certain electrical equipment and on which is fastened an insulating support 46 engaging the insulating enclosure 47 of a probe 48. The probe is an electric conductor 48 located within the casing 47 except that its end is completely exposed. The exposed end of the probe is disposed a short distance above the surface of the ridge 7 and is located so as to span the row 9 as the device advances.

The operation of the probe is in part dependent upon the height of a plant. If a plant is not sufficiently far above the ridge 7 as to be contacted by the advancing probe 48, there is no signal. If the plant is sufficiently high, when the advancing probe 48 comes into contact with it, an electrical signal is given. This is preferably accomplished by completing an electrical circuit through the plant acting as an electrical conductor. The circuit is traced through the ground 6 and the machine frame 12. The tires 13, 14 and 15 are usually non-conducting rubber, insulating the frame from the ground. A metal disc 49 is mounted on the axle 18 of the rear wheel and digs into and forms an electrical contact with the ground and is connected to the other metallic parts of the frame.

The electronic circuitry within the housing 44 is such that when the probe comes even lightly into contact with a plant, an impulse is provided for the single cycle clutch 36. It is not necessary to keep the probe particularly clean and free of dust and the like, nor is machine vibration important since the least abutment of the plant with the probe is sufficient to cause energization. It is true that an unwanted plant such as a weed can also actuate the probe, but in the usual case the wanted plants extend above the ridge farther than weeds do, so that by appropriate vertical adjustment of the probe and by utilizing the mechanism at the right time in the growing season, it is possible to eliminate virtually all extraneous weed influence.

It is also true that a clod or the like in the path of the probe and contacted by the probe will also trigger the single cycle clutch. In the usual field cultivation, however, the top of the ridge 7 is relatively smooth and devoid of clods so that it is unusual for an errant triggering to occur.

When triggered by a plant, the single cycle clutch 36 revolves the disc 28 through one turn. As soon as the window 29 has cleared the top of the ridge 7, the periphery of the disc acts virtually as a plow and removes the upstanding plants from the ridge ahead of it and shunts such plants to one side into the furrow 8. The disc continues to remove plants as the machine advances until such time as the window 29 is virtually back in its full cycle position. The next large plant passes through the window and itself then contacts the probe to actuate the clutch. In this fashion and with a steady advance of the machine, the disc upon each actuation is effective to remove plants from a predetermined distance along the ridge. At the end of that distance, should there be no upstanding plant, the machine will continue until such time as an upstanding plant passes through the window 29 and does come into contact with the probe, whereupon the removal operation repeats.

If there are plants in the row of insufficient height to be engaged by the probe 48, these unwanted smaller plants are removed by a trailing blade 51 attached to the periphery of the disc 28. The blade is behind the window and is sufficiently spaced behind the disc to afford adequate room for a plant of full size. The blade acts as a scraper to cut off plants in its path but is rotated away from a full-size plant that has contacted the probe.

In a modified form of the invention shown in FIGURES 3 and 4, the carriage and frame are substantially as previously described. There is attached to the frame 61 a longitudinally extending shaft 62 carried in bearings 63 and 64 and effective to oscillate about a longitudinal axis substantially parallel with the plant row 66. Mounted on the shaft 62 and depending therefrom is a radially adjustable blade 67 having a branched lower end 68. The blade is constituted either of a single portion or, as shown particularly in FIGURE 5, is constituted of a pair of portions 69 and 71 spaced apart in the direction of advance of the mechanism to leave a gap.

Extending from the shaft 62 is a crank arm 72 pivotally joined through a link 73 to the piston rod 74 of a pneumatic jack 76 including a cylinder 77. The motion of the piston rod 74 is controlled by an air valve 78 on the jack 76 in turn controlled by a solenoid 79.

Mounted on the frame 61 in a position trailing the blade 67 is a probe 81 comparable to the previously described probe. An electrically conducting central member is surrounded by an insulating cover 82, except for a bare end, and is mounted on the frame as before. The probe is adjustable and is connected to electronic circuitry included in a housing 84 mounted on the frame. In this instance, when the probe 81 comes into physical and electrical contact with a plant 85, a circuit is completed from the probe through the ground, then through a grounding plate 86 to the frame of the machine to which the probe circuitry is connected. When the circuit is closed, the solenoid 79 is actuated by the electrical impulse and the air jack 76 is effective to reciprocate the blade 67 in either of two modes.

In one mode, the blade is reciprocated from right to left, in FIGURE 4, from the full line position into the dotted line position. This transverse motion sweeps out all of the plants or a block of plants immediately ahead of the plant 85 that contacted the probe 81. Following this, the knife 67 sweeps back from left to right to its initial position and stops. In the other mode of operation, the blade 67 sweeps from the right-hand position to the left-hand position and then stops. The next impulse then causes the blade to sweep from the left-hand position back to the right-hand position and stop. If all of the trash, removed plants and earth, is to be in one furrow, the blade 67 makes a complete excursion in both directions. If trash is to be deposited in both furrows, then the blade makes an excursion in only one direction for each impulse.

If the form of blade particularly shown in FIGURE 5 is utilized, then the blade not only removes a block of plants in advance of the selected plant, but also the blade sweeps or re-sweeps the area in the row behind the selected plant. There may be some overlapping of the swept areas, but there is asurance that a predetermined free area is afforded both ahead of and behind the selected plant.

In both forms of the invention, the electronic circuitry utilized is substantially as shown in FIGURE 6. The frame of the machine operates at ground potential, as indicated by the frame ground 101. A source of current at a relatively high voltage; for example, one hundred ten volt alternating current, is provided across a pair of conductors 102 and 103. The conductor 103 extends to the solenoid 79 which actuates the air valve 78. A lead 104 connects the solenoid 79 to a selector switch 105 which has two optional positions. In the position shown, the switch 105 connects through a conductor and a switch 106 to the conductor 102. When the switch 106 is closed, the solenoid is energized to operate the valve 78 so that the jack completes an outstroke and an instroke. In other position, the switch 105 connects through a conductor 107 and a switch 108 as well as a conductor 109 to the conductor 102. When the switch 108 is first actuated, it operates the valve 78 so that the jack completes an outstroke. When the switch 108 is next actuated, it operates the valve 78 so that the jack completes an instroke. Thus, the switch 105 controls the two modes of operation of the blade portions 69 and 71. When the disc 28 is used, the solenoid 79 is arranged to operate the single cycle clutch 36, and the switch 105 and the switch 108 are omitted.

The switch 106 is operated by a solenoid 110 while the switch 108 is operated by a solenoid 111 connected in parallel with the solenoid 110 in an electrical circuit operating with direct current at a low voltage and entirely isolated from the high voltage circuitry. A battery 112 is connected by a conductor 113 to ground 6. This is an actual earth connection through the disc 49 or the plate 86. The other side of the battery is joined by a conductor 114 to one side of a switch 115. The other side of the switch 115 is connected by a lead 116 to one side of the two solenoids 110 and 111. The other side of the solenoids 110 and 111 is joined by a conductor 117 to the cathode of a silicon controlled rectifier 118, the anode of which is connected to ground by a conductor 119.

The probe 48 (or 81) connects through a lead 120 to a junction point 121 from which a conductor 122 containing a variable resistor 123 and a fixed resistor 124 extends to a junction with the conductor 114. Also from the junction point 121 a lead 125 connects to the gate of a field effect transistor 126, the drain of which is joined by a lead 127 to the conductor 119 and the source of which is connected to a lead 128 extending to a Zener diode 129. A resistor 130 is connected to the lead 128 and to the conductor 114. A diode 131 is connected in the opposite direction to the Zener diode by a connector 132 and is connected to the emitter of the transistor 118 by a conductor 133. A variable resistor 134 is connected to the conductors 133 and 114.

From the conductor 117 a lead 135 branches to connect respectively to a variable resistor 136 and to a diode 137, both connected to a lead 138 that in turn branches to connect to one side of a capacitor 139 and to one end of a switch coil 140. A connector 141 joins both the other side of the capacitor 139 and the other end of the switch coil 140 through a variable resistor 142 to the lead 116.

This circuit is stable and quiescent until a plant or similar object contacts the probe 48 (or 81). Thereupon energy is supplied to the solenoids 110 and 111 to actuate the switches 106 and 108 to produce whichever mode of air jack operation is selected by the switch 105. Energy is also supplied to the switch coil 140 so that shortly after the coils 110 and 111 have acted the switch 115 is opened and the circuit is restored to quiescence. The time delay is governed by the resistors 136 and 142 so that an inadvertent contact with the probe too soon after an actuation thereof is ineffective.

The sensitivity of the electronic circuitry varies with the values of the circuit components. It has been found in practice that an extremely sensitive response can be had to the presence of a plant against the probe. Yet this same sensitivity does not in any wise cause an actuation of the solenoid air valve or of the single cycle clutch because of vibration or motion or shaking of the mounting machine. In fact, the use of the electrical properties of the plant is effective to preclude operation of the structure by any normally encountered disturbing forces. It has also been found in practice that the sensitivity of the arrangement is such as not to be unusually affected by the short-term variations in moisture content of the plant or in moisture content of the ground, the average agricultural conditions or the normal variation therein all being sufficient for operation of the structure.

The sensitivity of the circuitry can be made such that the return current through the ground to the ground conductor 101 may be exceedingly slight, in fact so slight as to indicate that the factor which unbalances the circuit and causes the triggering action is not so much the conduct of electricity through the plant, but in many instances is merely the body capacity of the plant itself. That is to say, an abrupt change in capacity made manifest in the lead 120 is sufficient to cause triggering of the circuitry and operation of the structure. In fact, under some conditions, the ground connection 101 can be omitted and the contact of a plant with the probe 48 (or 81) will trigger the operation of the solenoids 110 and 111.

The electronic circuitry has its own battery 112 and is electrically isolated from the usual electrical equipment found on a draft tractor or comparable mechanism since stray currents in the framework may trigger the mechanism when triggering is not wanted. By varying the sensitivity of the electronic circuitry, either the return flow current through the plant and the ground or the capacity effect of the plant when contacted can be used separately or can be combined.

What is claimed is:

1. A plant thinning machine for use with a row of plants growing in the ground comprising a frame adapted to be advanced over said ground along said row, a shaft, means for mounting said shaft on said frame for limited oscillation about an axis extending lengthwise of said row and situated directly above said row of plants, a blade mounted on said shaft and disposed in a plane containing said axis, said blade having a length substantially equal to the length of a block of said plants to be removed from said row and having a radial dimension terminating substantially at said ground in the central position of oscillation of said blade in a position to dislodge some of said ground into the vicinity of said plants as said blade oscillates, an electrically conducting probe, means for mounting said probe on said frame to extend transversely of said row in a location slightly above the ground and just to the rear of said blade in a position in the path of some of said ground dislodged by said blade, means for oscillating said shaft to swing said blade from a first position on one side of said row through said row to a second similar position on the other side of said row, an electrical circuit including said probe and a return portion and adapted to be completed through said plant and said return portion by contact of said probe with a particular plant in said row, and means responsive solely and immediately to completion thereof to operate said oscillating means to make one swing of said blade, beginning at said first position and ending at said second position just ahead of said particular plant.

2. A device as in claim 1 in which control means are provided for selectively conditioning said circuit to swing said blade from said first position to said second position in response to one contact of said probe with a plant and then swing said blade from said second position to said first position in response to a subsequent contact of said probe with another plant or for swinging said blade from said first position to said second position and immediately back to said first position in response to each contact of said probe with a plant.

3. A device as in claim 1 in which a second blade substantially a duplicate of said first blade is mounted on said shaft coplanar with and rearwardly of said first blade, said first blade and said second blade being spaced axially apart to accommodate said probe and one of said plants between them.

4. A device as in claim 1 in which means are provided for retaining said blade either in said first position or said second position except when said oscillating means is operated in response to contact of said probe with a plant.

References Cited

UNITED STATES PATENTS

| | | | |
|---|---|---|---|
| 225,890 | 3/1880 | Sustaire | 172—73 X |
| 1,468,244 | 9/1923 | Marable | 172—73 |
| 2,592,689 | 4/1952 | Hann | 172—6 |
| 3,023,815 | 3/1962 | Bowman | 172—5 |
| 3,308,890 | 3/1967 | Rhode | 172—6 |
| 2,535,720 | 12/1950 | Boncompain. | |
| 2,664,802 | 1/1954 | Myer | 172—6 |
| 2,804,004 | 8/1957 | Hubalek et al. | 172—6 |
| 3,097,702 | 7/1963 | Cracknell et al. | 172—6 |
| 3,181,618 | 5/1965 | Miller | 172—6 |
| 3,233,681 | 2/1966 | Ferte | 172—6 |

FOREIGN PATENTS

| | | |
|---|---|---|
| 869,881 | 3/1953 | Germany. |
| 900,280 | 7/1962 | Great Britain. |

ROBERT E. BAGWILL, *Primary Examiner.*